United States Patent
Cruz et al.

(10) Patent No.: US 8,283,011 B2
(45) Date of Patent: *Oct. 9, 2012

(54) EASY-OPEN RECLOSABLE FILMS HAVING INTERIOR FRANGIBLE INTERFACE AND ARTICLES MADE THEREFROM

(75) Inventors: Tara Kay Cruz, Appleton, WI (US); Kevin Philip Nelson, Appleton, WI (US)

(73) Assignee: Curwood, Inc., Oshkosh, WI (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/021,855

(22) Filed: Feb. 7, 2011

(65) Prior Publication Data

US 2011/0123743 A1 May 26, 2011

Related U.S. Application Data (63) Continuation of application No. 11/247,923, filed on Oct. 11, 2005, now Pat. No. 7,927,679.

(51) Int. Cl.
*B32B 9/00* (2006.01)
*B32B 7/12* (2006.01)

(52) U.S. Cl. ............... 428/40.1; 428/41.7; 428/41.8; 428/41.9; 428/42.2; 428/42.3; 428/355 R; 428/355 EN (58) Field of Classification Search ............ 428/40.1, 428/41.7, 41.8, 41.9, 42.2, 42.3, 355 R, 55 EN
See application file for complete search history.

(56) References Cited

U.S. PATENT DOCUMENTS

| | | | |
|---|---|---|---|
| 4,704,314 A * | 11/1987 | Hsu et al. | 428/95 |
| 5,063,644 A | 11/1991 | Herrington et al. | |
| 5,089,320 A * | 2/1992 | Straus et al. | 428/216 |
| 5,301,394 A | 4/1994 | Richardson et al. | |
| 5,442,837 A | 8/1995 | Morgan | |
| 5,964,532 A | 10/1999 | St. Phillips et al. | |
| 6,409,384 B1 | 6/2002 | Provan et al. | |
| 6,439,770 B2 | 8/2002 | Catchman | |
| 6,524,002 B2 | 2/2003 | Tomic | |
| 6,527,444 B1 | 3/2003 | Buchman | |
| 6,609,827 B2 | 8/2003 | Bois et al. | |
| 6,616,333 B2 | 9/2003 | Kinigakis et al. | |
| 6,632,021 B2 | 10/2003 | Bois et al. | |
| 6,663,283 B1 | 12/2003 | Cappel | |
| 6,666,580 B2 | 12/2003 | Bois | |
| 6,679,027 B2 | 1/2004 | Schreiter | |
| 2002/0097923 A1 | 7/2002 | Dobreski et al. | |
| 2002/0196987 A1 | 12/2002 | Tilman et al. | |

* cited by examiner

*Primary Examiner* — Patricia Nordmeyer
(74) *Attorney, Agent, or Firm* — Tom J. Hall (57) ABSTRACT

The present invention relates to peelable resealable multilayer films which include at least a first polymer layer, a second polymer layer of pressure-sensitive adhesive in direct contact with and bonded to both the first and third layers. The bond formed between the second and third layers includes a peelable resealable interface having a first interfacial peel strength, A, and a second interfacial peel strength, B. The peelable resealable interface includes a first interfacial peel strength, A, having a value of less than 3500 gram-force/inch (1350 newton/meter) as measured in accordance with ASTM F-904-98 test method when the films of the present invention are peeled from a second thermoplastic film to which the film has been heat-sealed. The second interfacial peel strength, B, has a value of at least 400 gram-force/inch (154 newton/meter) as measured in accordance with ASTM F-904-98 test method when the films are peeled from and re-adhered to a second film.

13 Claims, 5 Drawing Sheets

EASY-OPEN RECLOSABLE FILMS HAVING INTERIOR FRANGIBLE INTERFACE AND ARTICLES MADE THEREFROM

This application is a continuation application of U.S. patent application Ser. No. 11/247,923, filed on Oct. 11, 2005, now U.S. Pat. No. 7,927,679 which is incorporated herein by reference in its entirety.

BACKGROUND OF THE INVENTION

The present invention generally relates to multilayer films for packaging applications, and particularly, to multilayer thermoplastic films for flexible packages which have both an easy-open and a reclosable feature.

Flexible packages which combine an easy-open feature with reclosability provide consumers with a convenient means to open a package without the use of scissors, knives or other cutting implements, and a reliable manner to re-close the package as often as needed. Various methods have been used to provide both these features which include, for example, mechanical strips, such as interlocking fasteners or zippers, and adhesive strips positioned on an exterior film surface or within the film structure. These methods are known in the art and have been disclosed in U.S. Pat. Nos. 5,063,644; 5,301,394; 5,442,837; 5,964,532; 6,409,384; 6,439,770; 6,524,002; 6,527,444; 6,609,827; 6,616,333; 6,632,021; 6,663,283; 6,666,580; 6,679,027; and U.S. Patent Application Nos. 2002/0097923; and 2002/0196987, each of which is incorporated by reference herein. These easy-open/reclosable means all require additional steps in the manufacturing of attaching or incorporating the strips onto or into the package and the extra cost of the strips themselves. It would be desirable to provide a thermoplastic film having an easy-open feature and reclosability without the additional processing steps and associated cost as mentioned in the prior art.

SUMMARY OF THE DISCLOSURE

The present invention provides peelable resealable multilayer films comprising at least a first polymer layer, a second polymer layer, a third polymer layer such that the second layer is in direct contact with and bonded to the first and third layers. The films according to the present invention may be considered "peelable" when the bond between two interior film layers comprises a peelable resealable interface adapted to separate by application of pulling or peeling force exerted away from the film which has been heat-sealed to a second thermoplastic film. The force required to separate the interface may be dependent upon the chemical composition of each of the two interior film layers, i.e., the chemical similarities or dissimilarities of each film layer, or both the chemical composition and thickness of each interior film layer. By separating at least a portion of the interface, the face-to-face surfaces of each interior film layer are exposed. The films according to the present invention may also be considered "resealable" when the bond between the two interior layers forms an interface adapted to reseal after separation. Generally, the force required to "reseal" the interface is proportional to the manual pressure exerted on the film. Accordingly, the peelable resealable interface of the films, according to the present invention, may include a first interfacial peel strength and a second interfacial peel strength.

As a first aspect, the present disclosure is directed to peelable resealable multilayer films which include at least a first polymer layer and a second polymer layer of pressure-sensitive adhesive in direct contact with and bonded to both the first and third layers. The bond formed between the second and third layers includes a peelable resealable interface having a first interfacial peel strength "A" and a second interfacial peel strength "B". The peelable resealable interface is adapted to remain secure and unbroken during package fabrication, distribution and storage, and yet may be easily and repeatedly separated and rejoined. Accordingly, the peelable resealable interface includes a first interfacial peel strength, A, having a value of less than 3500 gram-force/inch (1350 newton/meter) as measured in accordance with ASTM F-904-98 test method when the films of the present invention are peeled from a second thermoplastic film to which the film has been heat-sealed. The second interfacial peel strength, B, has a value of at least 330 gram-force/inch (127 newton/meter) and, preferably, at least 400 gram-force/inch (154 newton/meter) as measured in accordance with ASTM F-904-98 test method when the films are peeled from and re-adhered to a second film. Moreover, the first interfacial peel strength, A, and the second interfacial peel strength, B, are such that the relative values of A and B satisfy the relationship $A \geq B$.

In a second aspect, the present invention provides peelable resealable multilayer films comprising at least a first polymer layer of a material selected from the group consisting of polyolefin, ionomer or blends thereof, a second polymer layer of tacky pressure-sensitive adhesive, and a third polymer layer having a glass transition temperature of at least 50° C. such that the bond formed between the second and third layers includes a peelable resealable interface.

Preferably, the films of the present invention may comprise a first polymer layer of a homopolymer or copolymer selected from the group consisting of polyolefin, ionomer or blends thereof, and more preferably, ionomer, polyethylene, polypropylene, polybutylene or blends thereof.

Preferably, the films of the present invention may comprise a second polymer layer of a pressure-sensitive adhesive comprising a tackifier first component and an elastomer second component of styrene/rubber copolymer.

Preferably, the films of the present invention may comprise a third polymer layer which includes a material selected from the group consisting of ethylene/vinyl alcohol copolymer, polyester, polyketone, polystyrene, acrylic ester-based polymer, cyclic olefin copolymers, methylpentene homopolymer or copolymer, polyamide, and blends thereof.

Preferably, the films of the present invention may include a first polymer layer, a second polymer layer and a third polymer layer as described hereinabove and further comprise a fourth polymer layer comprising an anhydride-modified polyolefin, and a fifth polymer layer comprising a material selected from the group consisting of polyolefin, polyester, polyamide and blends thereof.

As a third aspect, the present invention provides peelable resealable packages formed of a multilayer thermoplastic film structure as set forth above in connection with the first or second aspect of the invention. Preferably, the films may be thermoformable or non-thermoformable such that they may be suitable for use as a lidding portion, a semi-rigid or rigid preformed tray portion, or both the lidding and tray portions of a container. Films according to the present invention may form peelable reclosable packages or a portion thereof by heat sealing together two exterior film surfaces of a single film, the exterior surface of the one film to an exterior surface of a second compositionally identical film, or the exterior surface of one film to the exterior surface of a compositionally different thermoplastic film.

DETAILED DESCRIPTION OF THE DISCLOSURE

As used herein, the term "film" is use in the generic to include plastic web, regardless of whether it is a film or sheet.

As used herein, the term "thermoplastic" refers to a polymer or polymer mixture that softens when exposed to heat and then returns to its original condition when cooled to room temperature. In general, thermoplastic materials include, but are not limited to, synthetic polymers such as polyolefins, polyesters, polyamides, polystyrenes, and the like. Thermoplastic materials may also include any synthetic polymer that is cross-linked by either radiation or chemical reaction during the manufacturing or post manufacturing process operation.

As used herein, the term "polymer" refers to a material which is the product of a polymerization or copolymerization reaction of natural, synthetic, or natural and synthetic monomers and/or comonomers, and is inclusive of homopolymers, copolymers, terpolymers, etc. In general, the layers of a film of the present invention may comprise a single polymer, a mixture of a single polymer and non-polymeric material, a combination of two or more polymer materials blended together, or a mixture of a blend of two or more polymer materials and non-polymeric material. It will be noted that many polymers may be synthesized by the mutual reaction of complementary monomers. It will also be noted that some polymers are obtained by the chemical modification of other polymers such that the structure of the macromolecules that constitute the resulting polymer can be thought of as having been formed by the homopolymerization of a hypothetical monomer.

As used herein, the term "copolymer" refers to a polymer product obtained by the polymerization reaction or copolymerization of at least two monomer species. Copolymer may also be referred to as bipolymers. The term "copolymer" is also inclusive of the polymerization reaction of three, four or more monomer species having reaction products referred to terpolymers, quaterpolymers, etc. As used herein, a copolymer identified in terms of a plurality of monomers, e.g., ethylene/propylene copolymer, refers to a copolymer in which either monomer may copolymerize in a higher weight or molar percent than the other monomer or monomers. It is appreciated by a person of ordinary skill in the art that the term "copolymer," as used herein, refers to those copolymers where the first listed comonomer is polymerized in a higher weight percent than the second listed comonomer.

As used herein, terminology employing a "/" with respect to the chemical identity of any copolymer, e.g., an ethylene/unsaturated ester copolymer, identifies the comonomers which are copolymerized to produce the copolymer.

As used herein, the phrase "polyolefin" refers to homopolymers and copolymers having a methylene linkage between monomer units which may be formed by any method known to a person of ordinary skill in the art. An example of a polyolefin includes polyethylene (PE) which includes, but is not limited to, low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), and polyethylenes comprising ethylene/α-olefin copolymers (E/AO). These ethylene/α-olefin copolymers are copolymers of ethylene with one or more α-olefins (alpha-olefins) such as butene-1, hexene-1, octene-1, or the like as a comonomer. Other examples of polyolefin include cyclic olefin copolymers (COC), ethylene/propylene copolymers (PEP), polypropylene (PP), propylene/ethylene copolymer (PPE), polyisoprene, polybutylene (PB), polybutene-1, poly-3-methylbutene-1, poly-4-methylpentene-1, and propylene/α-olefins (P/AO) which are copolymers of propylene with one or more α-olefins (alpha-olefins) such as butene-1, hexene-1, octene-1, or the like as a comonomer. Exemplary of commercially available polyethylenes suitable for use in the present invention include, but are not limited to, the linear low-density polyethylene family of resins supplied by ExxonMobil Chemical Company, Houston, Tex., U.S.A. A particularly suitable grade includes, but is not limited to, for example, ExxonMobil ESCORENE® LLDPE LL1001.32 having a melt index of 1.0 dg/min., a density of 0.918 g/cm$^3$, and a melting point of 121° C. An example of a commercially available polypropylene suitable for use in the present invention is sold under the trademark BP Amoco ACCLEAR® 6219 from Innovene, Chicago, Ill., U.S.A. Exemplary of commercially available cyclic olefin copolymers suitable for use in the present invention include, but are not limited to, the TOPAS® family of resins, e.g., TOPAS® 8007 grade having a glass transition temperature of 80° C., a tensile strength of 9600 psi, and a tensile modulus of 377,000 psi, which is supplied by Celanese-Ticona, Summit, N.J., U.S.A.

As used herein, the phrase "modified polyolefin", refers to a chemical derivative of a polyolefin, e.g., a polyolefin having any form of anhydride functionality, such as anhydride of maleic acid, crotonic acid, citraconic acid, itaconic acid, fumaric acid, etc., whether grafted onto a polymer, copolymerized with a polymer, or blended with one or more polymers. Exemplary of commercially available anhydride-modified polyolefins suitable for use in the present invention include, but are not limited to, the BYNEL® family of resins, e.g., BYNEL® 41E687 grade having melt index of 1.7 dg/min. (at 190" C.), a density of 0.91 g/cm$^3$, a melting point of 119° C., which is supplied by du Pont de Nemours and Company, Wilmington, Del., U.S.A.

As used herein, the term "ionomer" refers to an ionic copolymer formed from an olefin and an ethylenically unsaturated monocarboxylic acid having the carboxylic acid moieties partially neutralized by a metal ion. Suitable metal ions may include, but are not limited to, potassium, lithium, cesium, nickel, zinc and preferably sodium. Suitable carboxylic acid comonomers may include, but are not limited to, ethylene/methacrylic acid, methylene succinic acid, maleic anhydride, vinyl acetate/methacrylic acid, methyl/methacrylate/methacrylic acid, styrene/methacrylic acid and combinations thereof. Useful ionomer resins may include an olefinic content of at least 50% (mol.) based upon the copolymer and a carboxylic acid content of between 5-25% (mol.) based upon the copolymer. Useful ionomers are also described in U.S. Pat. No. 3,355,319 to Rees, which is incorporated herein by reference in its entirety. Exemplary of commercially available ionomers suitable for use in the present invention include, but are not limited to, the SURLYN® family of resins, e.g., SURLYN® 1601 grade having a density of 0.940 g/cm$^3$, a melt flow index of 1.30 dg/min. (at 190° C.), a Vicat softening point of 73.9° C., which is supplied by du Pont de Nemours and Company, Wilmington, Del., U.S.A.

The phrase "glass transition temperature" as used herein means the temperature at which a polymer changes from an amorphous glassy state to a rubbery state, and in the transition region, various properties such as an elastic modulus, an expansion coefficient, a heat content, a refractive index, a dielectric constant, and so forth, are changed. The glass transition temperature can be measured from the change of these properties, but more definitely, this can be evaluated by a known method by using differential scanning calorimetry (DSC) or dynamic mechanical analysis (DMA). When measuring the glass transition temperature by the differential scanning calorimetry, the glass transition temperature can be determined by ASTM D-3417 test method, which is incorporated herein by reference. Alternatively, ASTM E-1640-04 test method may be used to determine the glass transition temperature by dynamic mechanical analysis, the disclosure of which is incorporated herein by reference.

As used herein, the terms "coextruded" or "coextrusion" refer to the process of extruding two or more polymer materials through a single die with two or more orifices arranged so that the extrudates merge and weld together into a laminar structure before chilling, i.e., quenching. The films according to the present invention may be fabricated by any coextrusion method known to a person of ordinary skill in the art which may be include, but is not limited to, for example, blown film coextrusion, slot cast coextrusion, and extrusion coating, preferably, slot cast and single-bubble blown film, and more preferably, single-bubble blown film.

As used herein, the phrase "interior film layer," as applied to film of the present invention, refers to any film layer having both its principal surfaces directly adhered to another layer of the film. In contrast, the phrase "exterior film layer" refers to any film layer having less than two of its principal surfaces directly adhered to another layer of the film.

As used herein, the phrase "direct contact and bonded" as applied to film layers of the present invention, defines a subject film layer having face-to-face contact to another film layer (presumably, over their entire planar surfaces).

As used herein, the term "heat-seal" refers to both a film layer which is heat sealable to itself or other thermoplastic film layer, and the formation of a fusion bond between two polymer surfaces by conventional indirect heating means. It will be appreciated that conventional indirect heating generates sufficient heat on at least one film contact surface for conduction to the contiguous film contact surface such that the formation of a bond interface therebetween is achieved without loss of the film integrity.

As used herein, the phrase "ethylene/vinyl alcohol copolymer" refers to hydrolyzed copolymers of ethylene and vinyl acetate monomers. Ethylene/vinyl alcohol copolymers can be represented by the general formula: $[(CH_2-CH_2)_m-(CH_2-CH(OH))_n]$. Exemplary of commercially available ethylene/vinyl alcohol copolymers suitable for use in the present invention include, but are not limited to, the SOARNOL® family of resins, e.g., SOARNOL® ET3803 grade having a reported bulk density of 0.64-0.74 g/cm$^3$, a relative density of 1.13-1.22 g/cm$^3$, a melting point of 164-188° C., which may be obtained from The Nippon Synthetic Chemical Industry Company, Ltd. (Nippon Gohsei), Osaka, Japan.

As used herein, the term "polyester" refers to homopolymers or copolymers having an ester linkage between monomer units which may be formed, for example, by condensation polymerization reactions between a dicarboxylic acid and a diol. The ester linkage can be represented by the general formula: $[R-C(O)O-R']_n$ where R and R'=the same or different alkyl group and may be generally formed from the polymerization of dicarboxylic acid and diol monomers or monomers containing both carboxylic acid and hydroxyl moieties. The dicarboxylic acid may be linear or aliphatic, i.e., lactic acid, oxalic acid, maleic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. The polyalkyl terephthalates are aromatic esters having a benzene ring with ester linkages at the 1,4-carbons of the benzene ring as compared to polyalkyl isophthalate, where two ester linkages are present at the 1,3-carbons of the benzene ring. In contrast, polyalkyl naphthalate are aromatic esters having two fused benzene rings where the two ester linkages may be present at the 2,3-carbons or the 1,6-carbons. Exemplary of commercially available polyethylene terephthalates suitable for use in the present invention include, but are not limited to, the EASTAPAK®, EASTPAK® and EASTAR® families of resins which are all supplied from Eastman Chemical Company, Kingsport, Tenn., U.S.A. A particularly suitable grade of the EASTAR® polyethylene terephthalate is EASTAR® 6763 polyethylene terephthalate copolymer, which is a copolymer formed from terephthalic acid, ethylene glycol and cyclohexane dimethanol, and has glass transition temperature of 80° C., a tensile modulus of 300,000 psi, a flexural modulus of 300,000 psi, and a reported density of about 1.27 g/cm$^3$.

As used herein, the term "polyamide" refers to homopolymers or copolymers having an amide linkage between monomer units which may be formed by any method known to those skilled in the art. The amide linkage can be represented by the general formula: $[R-C(O)N-R']_n$ where R and R'=the same or different alkyl group. Useful polyamide homopolymers include nylon 6 (polycaprolactam), nylon 11 (polyundecanolactam), nylon 12 (polyauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6,6/9 copolymer (polyhexamethylene adipamide/azelaiamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here. Exemplary of even more suitable polyamides include nylon 4,I, nylon 6,I, nylon 6,6/6I copolymer, nylon 6,6/6T copolymer, MXD6 (poly-m-xylylene adipamide), nylon 6T/6I copolymer, nylon 6/MXDT/I copolymer, nylon MXDI, poly-p-xylylene adipamide, polyhexamethylene terephthalamide, polydodecamethylene terephthalamide and the like. The generic source-based nomenclature convention is used to name the hereinabove nylon polymers and copolymers. See "Generic Source-Based Nomenclature for Polymers," *Pure Applied Chemistry*, Vol. 73, No. 9, pp. 1511-1519 (International Union of Pure and Applied Chemistry 2001). Exemplary of commercially available polyamides suitable for use in the present invention include, but are not limited to, the ULTRAMID® family of resins supplied by BASF, Mount Olive, N.J., U.S.A. and ZYTEL® family of resins provided by du Pont de Nemours and Company, Wilmington, Del., U.S.A. A particularly suitable grade of the ULTRAMID® polyamide includes ULTRAMID® B36 nylon 6 having a glass transition temperature of 127° C., a density of 1.13 g/cm$^3$, and tensile strength (at yield) of 131,000 psi.

As used herein, the term "acrylic ester" refers to acrylate-functional homopolymers and copolymers which can be represented by the general formula: $[C(R)(C(O)OCH_3)CH_2]_n$ where R is an alkyl group, such as, but not limited to, for example, methyl, ethyl, butyl and 2-ethylhexyl. Exemplary of commercially available acrylic ester-based polymer suitable for use in the present invention include, but are not limited to, the PERSPEX® family of resins having tensile strength of at least 7800 psi, a flexural modulus of at least 400,000 psi which are supplied by Lucite International, Ltd., Southampton, U.K.

As used herein, the term "polyketone" refers to homopolymers and copolymers having at least one ketone linkage between monomer units which may be formed by any method known to those skilled in the art. The ketone linkage can be represented by the general formula: $[R—C(O)—R']_n$ where R and R'=the same or different alkyl group. Exemplary of formerly commercially available polyketones suitable for use in the present invention include, but are not limited to, the CARILON® family of resins having a flexural modulus of about 240,000 psi which are supplied by Shell Chemical Company, Houston, Tex., U.S.A.

As used herein, the term "methylpentene" refers to polyolefin homopolymers and copolymers derived from 4-methylpentene-1. These polymers can be represented by the general formula: $[CH(CH_2(CH_3)_2—CH_2]_n$. Exemplary of commercially available methylpentene suitable for use in the present invention include, but are not limited to, the TPX® family of resins which are supplied by Mitsui Petrochemical Industries, Ltd., Tokyo, Japan.

As used herein, the term "polystyrene" refers to homopolymers and copolymers having at least one styrene monomer (benzene, i.e., $C_6H_5$, having an ethylene substituent) linkage within the repeating backbone of the polymer. The styrene linkage can be represented by the general formula: $[(C_6R_5)CH_2CH_2]_n$ where R=H or an alkyl group. Polystyrene may be formed by any method known to those skilled in the art. Suitable polystyrene include, for example, but are not limited to, oriented polystyrene (OPS) film and resins, i.e., polystyrene (PS), syndiotactic polystyrene (SPS), acrylonitrile-butadiene-styrene (ABS), styrene-acrylonitrile (SAN), ethylene/styrene copolymers, styrene/acrylic copolymers, styrene block copolymers (SBC), and the like. Exemplary of commercially available polystyrenes suitable for use in the present invention include, but are not limited to, POLYSTYRENE® 535 having a tensile modulus of 430,000, a flexural modulus of 450,000 which is supplied by Total Petrochemicals USA, Inc., Houston, Tex., U.S.A.

As used herein, the phrase "tacky pressure-sensitive adhesive" refers to adhesives which may be used to affix the surface of one film layer to the surface of another film layer with application of manual pressure. Preferably, the tacky pressure-sensitive adhesive may also allow one surface to be removed and/or repositioned from the other surface. Pressure-sensitive adhesives may include a combination of a tackifier first component and an elastomer second component of rubber, acrylic, silicone, or blends thereof. These pressure-sensitive adhesives are known in the art and are described in U.S. Pat. Nos. 4,673,601 and 5,089,320, which are incorporated herein by reference in their entireties. Preferably, the pressure-sensitive adhesive may comprises both a tackifier and an elastomer of styrene/rubber copolymer. A particular suitable tacky pressure-sensitive adhesive for use in the present invention includes, but is not limited to, for example, a material having a density of 0.96 g/cm$^3$ which is sold under the product name FINDLEY® M3156 from Bostik Findley, Inc., Wauwatosa, Wis., U.S.A.

As used herein, the phrase "styrene/rubber copolymer" refers to block copolymers including di-block, tri-block, radial block, multi-block and mixtures thereof of styrene and rubber. Suitable rubber segment of styrene/rubber copolymers may include, but are not limited to, butadiene, isoprene, butylene, ethylene-butylene, propylene, ethylene-propylene, ethylene and blends thereof. Exemplary styrene/rubber copolymers which are commercially available include styrene/rubber copolymers sold under the trademark KRATON® by Kraton Polymers, Houston, Tex., U.S.A. Styrene/rubber copolymers are fully disclosed in U.S. Pat. No. 5,221,534, the disclosure of which is incorporated herein by reference. As used herein, the term "tackifier" is generally an adhesive additive which serves to modify the rheological properties of the final adhesive. Specifically, a tackifier resin is used to improve the tack of the adhesive composition. As used herein, the term "tack" refers to the "stickiness" of the adhesive or its resistance to removal or deformation from a substrate. The tackifier may comprise any suitable material, preferably, a hydrocarbon resin material or mixtures thereof. Exemplary tackifiers are ESCOREZ® 1102, ESCOREZ® 1304, ESCOREZ® 1315, available from ExxonMobil Chemical Company, Houston, Tex., U.S.A.; WINGTAK® resins available from Sartomer Company, Inc., Exton, Pa., U.S.A.; PICCOTAC® 1100 and POLYPALE® 100 available from Eastman Chemicals, Kingsport, Tenn., U.S.A.

As used herein, the phrase "peel strength" refers to the force required to separate at least a portion of the interface between two adjoining interior film layers of the present invention when the film has been sealed to a second thermoplastic film. The peel strength may depend on the chemical similarity or dissimilarity of the two film layers and their individual thickness. Peel strength may also be affected by the composition and thickness of adjacent film layers which are ruptured during the separation of the interface. Peel strength may still further be affected by environmental conditions during film fabrication, the packaging process and whether there has been an initial separation of the interface and the number of times the interface has been separated and resealed. One method for determining bond strength is ASTM F-904 test method entitled, "Standard Test Method for Comparison of Bond Strength or Ply Adhesion of Similar Laminates Made from Flexible Materials" and published by ASTM International, West Conshohocken, Pa., U.S.A., which is herein incorporated by reference in its entirety. As referred to film structures of the present invention, peel strengths were determined in accordance with ASTM F-904 test method and included a modification to the test procedure. The modification entailed preparing test specimens by heat-sealing the surface of the subject film along its entire length to a second thermoplastic film with an end-portion of the subject film unsealed to the second film. With the test specimens prepared in this manner, the unsealed end-portion of the subject film was then peeled from the second film at an angle of at 180° relative to the second film.

Figure 1:
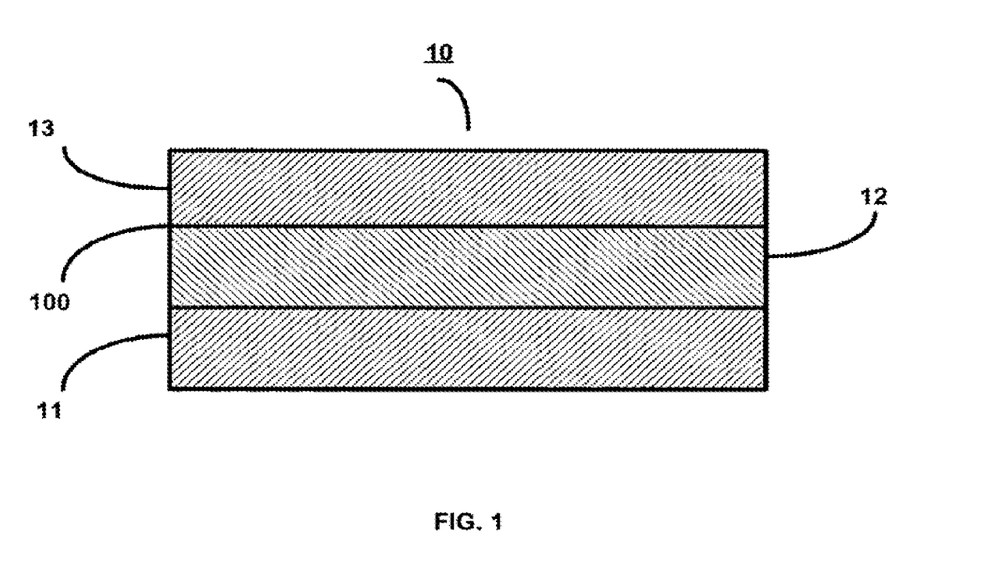
FIG. 1 shows a diagrammatic cross-sectional view of a multilayer film having three polymer layers according to the present disclosure.

With reference to the drawings, there is seen in FIG. 1 a peelable resealable multilayer film 10 having a first polymer layer 11, a second polymer layer 12 of pressure-sensitive adhesive, and a third polymer layer 13. As depicted, second polymer layer 12 is in direct contact and bonded to both first polymer layer 11 and third layer 13. The bond formed between polymer layers 12 and 13 creates a peelable resealable interface 100 therebetween. The force required to separate peelable resealable interface 100 may vary depending upon the individual chemical composition and thickness of both second and third polymer layers 12 and 13. It has been discovered that peelable resealable interface 100 may be formed by bonding second polymer layer 12 of pressure-sensitive adhesive to a third polymer layer 13, preferably, when a third polymer layer 13 comprises a material having a glass transition temperature of at least 5° C., and more preferably, when a third polymer layer 13 comprises a material having a glass transition temperature of at least 5° C. which is selected from the group consisting of ethylene/vinyl alcohol copolymer, polyester, polyketone, polystyrene, acrylic ester polymer, cyclic olefin copolymers, methylpentene copolymers, polyamide, and blends thereof. It will be noted that the force required to separate the interface formed by the bond between first polymer layer 11 and second polymer layer 12 is greater than the force needed to separate peelable resealable interface 100. It will be appreciated that first polymer layer 11 may comprise any material which bonds to second polymer layer 12 and provides an interface therebetween exhibiting a peel strength which is greater than peelable resealable interface 100. It has been also discovered that when first polymer layer 11 comprises a homopolymer or copolymer selected from the group consisting of polyolefin, ionomer or blends thereof, and preferably, ionomer, polyethylene, polypropylene, polybutylene or blends thereof, and is bonded to second polymer layer 12 of a pressure-sensitive adhesive, the interface formed therebetween may have a peel strength which is greater than peelable resealable interface 100. It will be also appreciated by those skilled in the art that film 10 may be formed as a unitary three-layer film structure or a three-layer substructure of a film having 4-7 or more film layers. It will be still further appreciated that film 10 may be formed be coextrusion of three separate polymer layers using either cast slot or blown film coextrusion methods.

Figure 2:
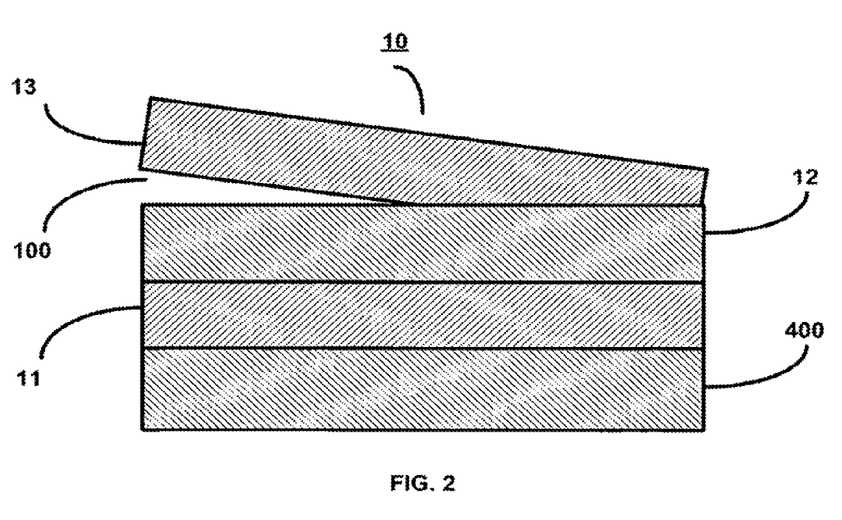
FIG. 2 shows a diagrammatic a cross-sectional view of a multilayer film having three polymer layers according to the present disclosure which is heat-sealed to a second thermoplastic and having a peelable resealable interface in a partially opened state.

In FIG. 2, peelable resealable multilayer film 10 is shown heat-sealed to a second thermoplastic film 400 and partially separated from film 400. FIG. 2 also illustrates peelable resealable interface 100 (see FIG. 1) in the partially open state. It will be appreciated that the film 10 may seal to itself or a second thermoplastic film structure by any chemical, thermal, or surface modification technique known to those skilled in the art. It will be also noted that the force required for separating the interface between film 10 and second thermoplastic film 400 is greater than the force required for separating peelable resealable interface 100. It will be further appreciated that the force required for separating peelable resealable interface 100 may be weaker after the interface 100 is initially separated and resealed to itself.

Figure 3:
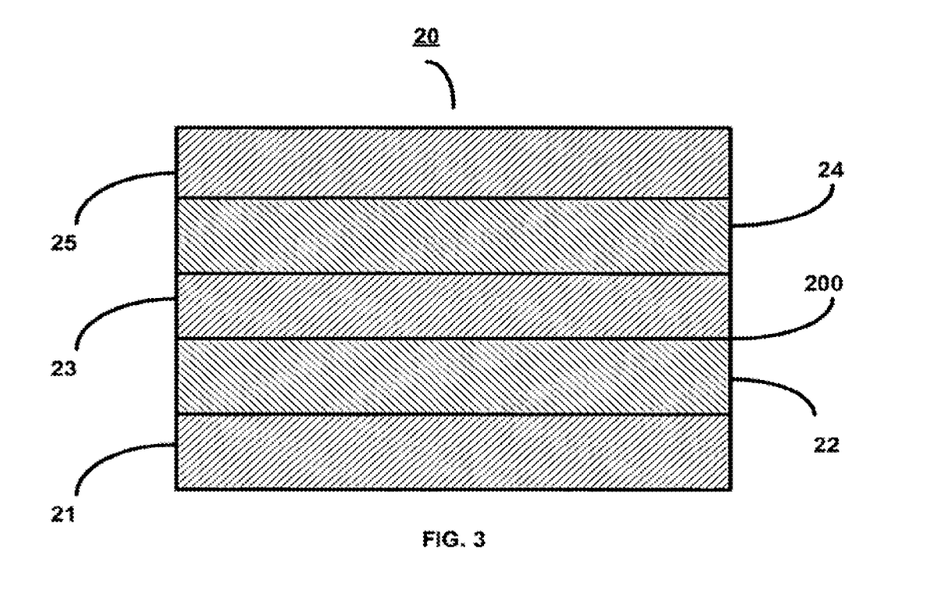
FIG. 3 shows a diagrammatic cross-sectional view of a multilayer film having five layers according to the present disclosure.

Turning now to FIG. 3, there is shown a five-layer peelable resealable multilayer film 20 having first polymer layer 21, second polymer layer 22, third polymer layer 23, fourth polymer layer 24, and fifth polymer layer 25. First, second and third polymer layers 21, 22 and 23 correspond to and may be selected according to the disclosure of the first through third polymer layers 11-13 of multilayer film 10 above. Fourth polymer layer 24 may comprise any suitable resin which will adhere third polymer layer 13 to fifth polymer layer 25. Preferably fourth polymer layer 24 includes an adhesive and more preferably, an anhydride-modified polyolefin. Fifth polymer layer 25 may comprise any polymer resin which can function as an exterior film layer, and preferably, is a material selected from the group consisting of polyolefin, polyester, polyamide and blends thereof. FIG. 3 also illustrates peelable resealable interface 200 in the closed state, with interface 200 being formed by the bond between polymer layers 22 and 23. Peelable resealable interface 200 may have the same interfacial peel strengths as peelable resealable interface 100 of film 10 in FIG. 2. It will be also appreciated that film 20 may be formed by coextrusion of five separate polymer layers using either slot cast or blown film coextrusion methods, preferably single-bubble blown film coextrusion methods. It will be also appreciated by those skilled in the art that film 20 may be alternatively formed by coextrusion of seven polymer layers as described in film 30, hereinbelow.

Figure 4:
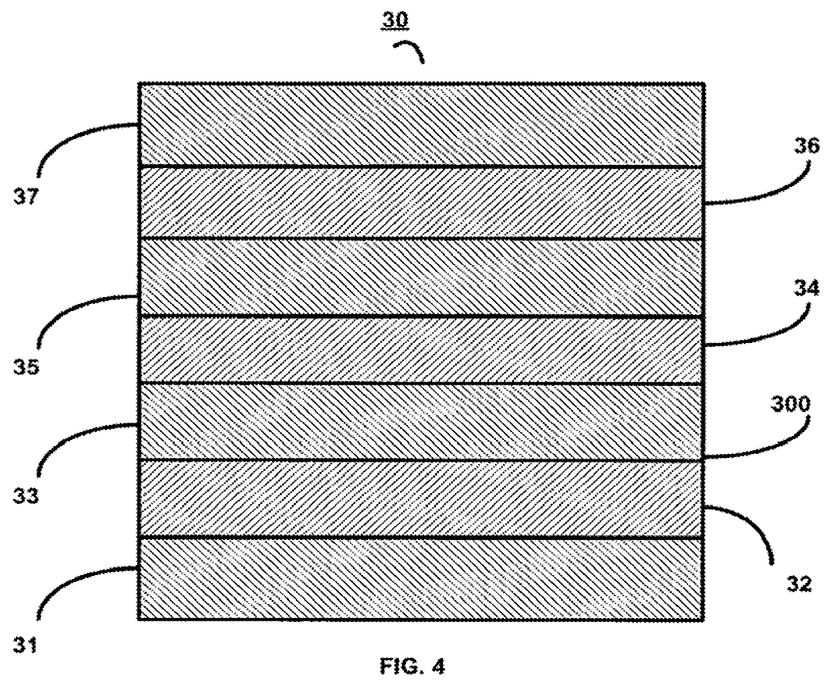
FIG. 4 shows a diagrammatic cross-sectional view of a multilayer film having seven layers according to the present disclosure.

In FIG. 4, there is shown a seven-layer peelable resealable multilayer film 30 having first polymer layer 31, second polymer layer 32, third polymer layer 33, fourth polymer layer 34, and fifth polymer layer 35, a sixth polymer layer 36, and a seventh polymer layer 37. First, third, fourth, fifth and seventh polymer layers 31, 33, 34, and 37 of film 30 may correspond to and be selected according to the disclosure of the first, second, third, fourth and fifth polymer layers 21, 22, 23, 24 and 25 of multilayer film 20 (see FIG. 3), respectively. In film 30, second polymer layer 32 may have an identical chemical composition as that of third polymer layer 33, and be disposed between first and third polymer layers 31 and 33. Sixth polymer layer 36 may have an identical chemical composition as that of seventh polymer layer 37 and be disposed between fifth and seventh polymer layers 35 and 37. As depicted, polymer layer 32 is in direct contact with and bonded to polymer layer 33, and polymer layer 36 is in direct contact with and bonded to polymer layer 37. Also illustrated in FIG. 4 is peelable resealable interface 300 which forms by the bond between second polymer layer 32 and third polymer layer 33. It will be appreciated that peelable resealable interface 300 may have interfacial peel strengths as that described for peelable resealable interfaces 100 of films 10 (see FIG. 2) and 200 of film 20 (see FIG. 3). It will be also appreciated by those skilled in the art that film 30 may be formed by coextrusion of seven separate polymer layers using either slot cast or blown film coextrusion methods, preferably single-bubble blown film coextrusion methods.

Figure 5:
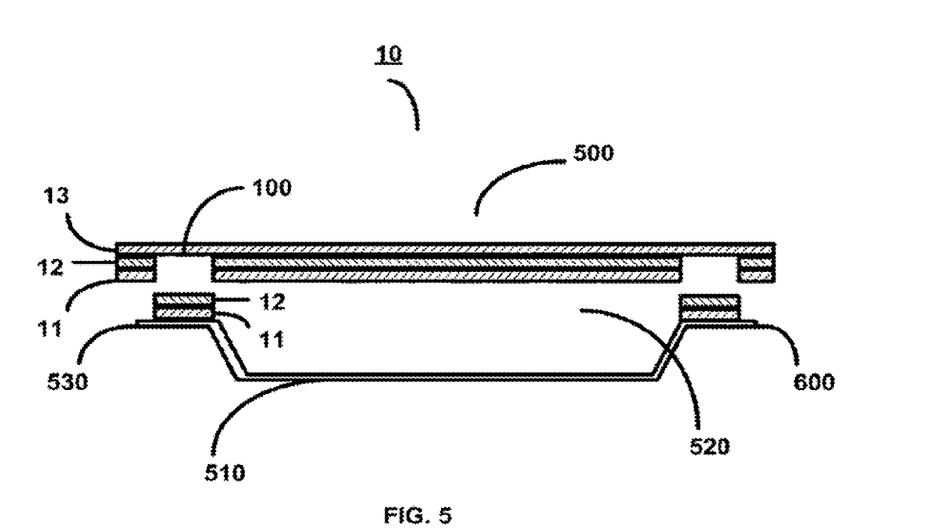
FIG. 5 shows a diagrammatic a cross-sectional view of a multilayer structure having three layers according to the present disclosure, in the form of a lidding sheet on a preformed container, in an opened state.

Turning now to FIG. 5, there is shown film 10 (see FIG. 1) in the form of a packaging lid 500 removed from a container 510. Container 510 may be formed from a second thermoplastic film 600 and may include a top opening 520 and a substantially flat peripheral rim 530 around the opening 520. It will be appreciated that film 10 may be heat-sealed and bonded to film 600 around the circumference of rim 530 and conform to the shape of opening 520. As depicted in FIG. 5, first and second polymer layers 11 and 12 remain sealed to container 510 in the area of the rim 530, and fractures such that the peel failure propagates internally from the interface between first polymer layer 11 and second film 600 to interface 100 (see FIGS. 1 and 2).

Preferably, multilayer films 10, 20 and 30 are non-oriented films such that each film has a heat shrinkage value of less than about 5% at 90° C., more preferably less than about 2% at 90° C. as measured in accordance with ASTM D-2732-96 test method. Heat shrinkage test is defined to be values obtained by measuring unrestrained shrink at 90° C. for five seconds. Four test specimens are cut to 10 cm. in the machine direction by 10 cm. in the transverse direction. Each specimen is completely immersed for 5 seconds in a 90° C. water bath (or other specified non-reactive liquid). The distance between the ends of the shrunken specimen is measured. The difference in the measured distance for the shrunken specimen and the original 10 cm. is multiplied by ten to obtain the percent of shrinkage for the specimen for each direction. The machine direction shrinkage for the four specimens is averaged for the machine direction shrinkage value of the given film sample, and the transverse direction shrinkage for the four specimens is averaged for the transverse direction shrinkage value.

Small amounts of additives, such as slip or anti-block agents, pigments and other processing aids, can be included in any of the layers in the peelable resealable multilayer films 10, 20 and 30 or in any layers further added to the structure which may be formed into a flexible film. Similarly, such additives may also be included in any of the layers discussed above in connection with peelable resealable multilayer film structures 10, 20 and 30 illustrated in FIGS. 1-5.

The disclosure will now be further described in the following non-limiting example:

In the following examples, all film structures are produced using a single-bubble coextrusion apparatus and method. The single-bubble blown film apparatus includes a multi-manifold annular die head for blown bubble film through which the film composition is forced and formed into a cylindrical tube or bubble. The bubble is immediately quenched, e.g., via cooled water bath, solid surface and/or air, and then ultimately collapsed and formed into a film.

EXAMPLE 1

The following resins were coextruded in the following structural relationship in accordance with film 30 of FIG. 4:

Layer 31: first polymer layer comprised 60.00% (wt.) of low-density polyethylene having a density of 0.921 g/cm$^3$, a melt index of 1.8 dg/min., a melting point of 109° C., available under the trademark PETROTHENE® NA 345-013 from Lyondell (Equistar) Chemical Company, Houston, Tex., U.S.A., 10.00% (wt.) cyclic olefin copolymer having a glass transition temperature of 136° C., which is sold under the trademark TOPAS® 5013S-04 by Celanese-Ticona, Summit, N.J., U.S.A., 20.00% (wt.) of linear low-density polyethylene having a density of 0.920 g/cm$^3$, a melt index of 1.0 dg/min., a melting point of 122" C., available under the trademark DOWLEX® 2045G from The Dow Chemical Company, Midland, Mich., U.S.A., 10.00% (wt.) of processing, antiblock and slip additives, and provided 10.0% of the total weight of multilayer film 30;

Layer 32: second polymer layer comprised 100% (wt.) pressure-sensitive adhesive available under the product name FINDLEY® M3156 from Bostik Findley, Inc., Wauwatosa, Wis., U.S.A., and provided 20.0% of the total weight of multilayer film 30;

Layer 33: third polymer layer comprised 100% (wt.) pressure-sensitive adhesive available under the product name FINDLEY® M3156 from Bostik Findley, Inc., Wauwatosa, Wis., U.S.A., and provided 10.0% of the total weight of multilayer film 30;

Layer 34: fourth layer comprised 100% (wt.) of ethylene/vinyl alcohol copolymer having density of 1.17 g/cm$^3$, a melt index of 1.7 dg/min. (at 190° C.), a melting point of 172° C., a glass transition temperature of 53° C., which is available under the trademark EVAL® H171 from Kuraray Company, LTD, Tokyo, Japan, and provided 10.1% of the total weight of multilayer film 30;

Layer 35: fifth layer comprised 100% (wt.) anhydride-modified polyolefin polyethylene having a density of 0.916 g/cm$^3$, a melt index of 1.1 dg/min., a Vicat softening point of 103° C., available under the trademark PLEXAR® PX3084 from Lyondell (Equistar) Chemical Company, Houston, Tex., U.S.A. and provided 4.9% of the total weight of multilayer film 30;

Layer 36: sixth polymer layer comprised of 47.35% (wt.) butene linear low-density polyethylene having a density of 0.918 g/cm$^3$, a melt index 1.0 10 g/min and sold under the trademark NOVAPOL® PF-0118-F from Nova Chemicals, Inc. Moon Township, Pa., U.S.A., 47.35% (wt.) ethylene/vinyl acetate copolymer having a density of 0.93 g/cm$^3$, a melt index of 0.35 10 g/min and sold under the trademark DUPONT™ ELVAX® 3135XZ from by du Pont de Nemours and Company, Wilmington, Del., U.S.A., 5.3% (wt.) processing, antiblock and slip additives, and provided 24.8% of the total weight of multilayer film 30;

Layer 37: seventh polymer layer comprised 47.35% (wt.) butene linear low-density polyethylene having a density of 0.918 g/cm$^3$, a melt index 1.0 10 g/min and sold under the trademark NOVAPOL® PF-0118-F from Nova Chemicals, Inc., Moon Township, Pa., U.S.A., 47.35% (wt.) ethylene/vinyl acetate copolymer having a density of 0.93 g/cm$^3$, a melt index of 0.35 10 g/min and sold under the trademark DUPONT· ELVAX® 3135XZ from by du Pont de Nemours and Company, Wilmington, Del., U.S.A., 5.3% (wt.) processing, antiblock and slip additives, and provided 20.2% of the total weight of multilayer film 30. The film described in Example 1 had a thickness of approximately 2.75 mils.

EXAMPLE 2

In Example 2, the resins were coextruded in the following structural relationship in accordance with FIG. 4. The film layers were identical in chemical composition and weight as described in Example 1, but with the following exceptions:

Layer 31: first polymer layer comprised 67.00% (wt.) of low-density polyethylene having a density of 0.923 g/cm$^3$, a melt index of 2.6 dg/min., a melting point of 113° C., available under the trademark DOW POLYETHYLENE® 608A from The Dow Chemical Company, Midland, Mich., U.S.A., 18.00% (wt.) of linear low-density polyethylene having a density of 0.926, a melt index of 0.6 dg/min. which is sold under the product name VORIDIAN® SC74580 from Eastman Chemical Company, Kingsport, Tenn., U.S.A., 10.00% (wt.) cyclic olefin copolymer having a glass transition temperature of 80° C., sold under the trademark TOPAS® 8007 by Celanese-Ticona, Summit, N.J., U.S.A., 5.00% (wt.) of processing, antiblock and slip additives, and provided 10.0% of the total weight of multilayer film 30;

Layers 32, 33 and 37 provided 17.0%, 8.00% and 31.20%, respectively, of the total weight of the multilayer film 30. The film described in Example 2 had a thickness of approximately 2.31 mils.

EXAMPLE 3

In Example 3, the resins were coextruded in the following structural relationship in accordance with FIG. 4. The film layers were identical in chemical composition and weight as described in Example 2, but with the following exceptions:

Layer 31: first polymer layer comprised 60.00% (wt.) of low-density polyethylene having a density of 0.923 g/cm$^3$, a melt index of 2.6 dg/min., a melting point of 113° C., available under the trademark DOW POLYETHYLENE@ 608A from The Dow Chemical Company, Midland, Mich., U.S.A., 30.00% (wt.) of linear low-density polyethylene having a density of 0.926, a melt index of 0.6 dg/min. which is sold under the product name VORIDIAN® SC74580 from Eastman Chemical Company, Kingsport, Tenn., U.S.A., 5.00% (wt.) cyclic olefin copolymer having a glass transition temperature of 80° C., sold under the trademark TOPAS@ 8007 by Celanese-Ticona, Summit, N.J., U.S.A., 5.00% (wt.) of processing, antiblock and slip additives, and provided 10.0% of the total weight of multilayer film 30;

Layers 32, 33 and 37 provided 15.00%, 5.00%, and 36.2%, respectively, of the total weight of the multilayer film 30. The film described in Example 3 had a thickness of approximately 2.75 mils.

EXAMPLE 4

In Example 4, the resins were coextruded in the following structural relationship in accordance with FIG. 4. The film layers were identical in chemical composition and weight as described in Example 2, but with the following exceptions:

Layers 32, 33 and 37 provided 17%, 8.00% and 31.20%, respectively, of the total weight of the multilayer film 30. The film described in Example 4 had a thickness of approximately 2.75 mils.

EXAMPLE 5

In Example 5, the resins were coextruded in the following structural relationship in accordance with FIG. 4. The film layers were identical in chemical composition and weight as described in Example 2, but with the following exceptions:

Layer 31: first polymer layer comprised 72.00% (wt.) of low-density polyethylene having a density of 0.923 g/cm$^3$, a melt index of 2.6 dg/min., a melting point of 113° C., available under the trademark DOW POLYETHYLENE® 608A from The Dow Chemical Company, Midland, Mich., U.S.A., 20.00% (wt.) of linear low-density polyethylene having a density of 0.926, a melt index of 0.6 dg/min. which is sold under the product name VORIDIAN® SC74580 from Eastman Chemical Company, Kingsport, Tenn., U.S.A., 5.00% (wt.) cyclic olefin copolymer having a glass transition temperature of 80° C., sold under the trademark TOPAS® 8007 by Celanese-Ticona, Summit, N.J., U.S.A., 3.00% (wt.) of processing, antiblock and slip additives, and provided 9.0% of the total weight of multilayer film 30. The film described in Example 5 had a thickness of approximately 2.75 mils.

EXAMPLE 6

In Example 6, the resins were coextruded in the following structural relationship in accordance with FIG. 4. The film layers were identical in chemical composition and weight as described in Example 2, but with the following exceptions:

Layer 31: first polymer layer comprised 75.00% (wt.) of low-density polyethylene having a density of 0.923 g/cm$^3$, a melt index of 2.6 dg/min., a melting point of 113° C., available under the trademark DOW POLYETHYLENE® 608A from The Dow Chemical Company, Midland, Mich., U.S.A., 10.00% (wt.) of linear low-density polyethylene having a density of 0.926, a melt index of 0.6 dg/min. which is sold under the product name VORIDIAN® SC74580 from Eastman Chemical Company, Kingsport, Tenn., U.S.A., 10.00% (wt.) cyclic olefin copolymer having a glass transition temperature of 80° C., sold under the trademark TOPAS® 8007 by Celanese-Ticona, Summit, N.J., U.S.A., 5.00% (wt.) of processing, antiblock and slip additives, and provided 10.0% of the total weight of the multilayer film 30;

Layers 32, 33 and 37 provided 20.0%, 7.0% and 29.2%, respectively, of the total weight of the multilayer film 30. The film described in Example 6 had a thickness of approximately 2.75 mils.

Multilayer film 30 described above in Examples 1-6 was formed via a coextrusion process. The film was formed by combining different streams of melt-plastified polymers into a single structure by slot or flat cast or blown bubble coextrusion. The flat die or slot cast process includes extruding polymer streams through a flat or slot die onto a chilled roll and subsequently winding the film onto a core to form a roll of film for further processing. In the blown bubble coextrusion process, streams of melt-plastified polymers are forced through an annular die having a central mandrel to form a tubular extrudate. The tubular extrudate is preferably expanded to a desired wall thickness by a volume of air or other gas entering the hollow interior of the extrudate via the mandrel, and then rapidly cooled or quenched by any of various methods known to those of skill in the art. The peelable resealable multilayer film of the present invention may vary in thickness of between 0.5-10 mil.

Table 1 illustrates peel strengths of the peelable resealable interfacial formed between Layer 33 and Layer 34 for films described in Examples 1-6. The peel strengths were measured by heat-sealing Layer 31 of the films in Examples 1-6 to a second thermoplastic film of polyethylene at a temperature of about 149° C., under a pressure of 30 psi and dwell time of one second. All peel strengths were determined in accordance to ASTM F-904 test method as described herein. The initial peel strength is identified as the "1$^{st}$" peel strength and indicates the peak and average values. Peel strengths measured after the first film was separated from and re-adhered to the second film are identified as "2$^{nd}$", "3$^{rd}$" and "4$^{th}$" peel strength, respectively, and indicate the peak and average values.

TABLE 1

| Film Structure | 1st Peel Strength Peak/Average (gram-force/inch) | 2$^{nd}$ Peel Strength Peak/Average (gram-force/inch) | 3$^{rd}$ Peel Strength Peak/Average (gram-force/inch) | 4$^{th}$ Peel Strength Peak/Average (gram-force/inch |
|---|---|---|---|---|
| Example 1 | 2101/1471 | 856/743 | 711/604 | 620/529 |
| Example 2 | 2548/1598 | 771/668 | 651/525 | 571/481 |

TABLE 1-continued

| Film Structure | 1st Peel Strength Peak/Average (gram-force/inch) | 2nd Peel Strength Peak/Average (gram-force/inch) | 3rd Peel Strength Peak/Average (gram-force/inch) | 4th Peel Strength Peak/Average (gram-force/inch) |
|---|---|---|---|---|
| Example 3 | 2191/1500 | 561/472 | 458/360 | 399/333 |
| Example 4 | 2344/1848 | 754/626 | 663/530 | 586/470 |
| Example 5 | 1789/1433 | 734/630 | 581/498 | 516/430 |
| Example 6 | 2265/1574 | 765/572 | 715/548 | 574/471 |

Unless otherwise noted, the physical properties and performance characteristics reported herein were measured by test procedures similar to the following methods. The following ASTM test procedures are incorporated herein by reference in their entireties:

| | |
|---|---|
| Density | ASTM D-1505 |
| Flexural Modulus | ASTM D-790 |
| Glass Transition Temperature | ASTM D-3417 |
| Heat Shrinkage | ASTM D-2732-96 |
| Melt Index | ASTM D-1238 |
| Melting Point | ASTM D-3417 |
| Peal Strength | ASTM F-904 |
| Tensile Modulus | ASTM D-638 |
| Tensile Strength | ASTM D-638 |
| Vicat Softening Point | ASTM D-1525 |

While various embodiments of the disclosure are herein described, it is envisioned that those skilled in the art may devise various modifications and equivalents without departing from the spirit and scope of the disclosure. The disclosure is not intended to be limited by the foregoing detailed description.

What is claimed is:

1. A peelable resealable multilayer film comprising:
    at least a first thermoplastic layer, a second thermoplastic layer and a third thermoplastic layer;
    wherein said first layer is an exterior film layer and comprises a material selected from the group consisting of ethylene/vinyl alcohol copolymer and cyclic olefin copolymer;
    wherein said second layer is in direct contact with and bonded to both said first and third layers; wherein said second layer comprises a tacky pressure-sensitive adhesive;
    wherein said bond between said first and second layers comprises a peelable resealable interface having a first interfacial peel strength "A" and a second interfacial peel strength "B" such that the value of A is less than 3500 gram-force/inch (1350 newton/meter) as measured in accordance with ASTM F-904 test method when peeled from a second thermoplastic film to which said film has been heat-sealed, and the value of B is at least 330 gram-force/inch (127 newton/meter) as measured in accordance with ASTM F-904 when peeled from and resealed to said second film;
    and wherein the relative values of A and B satisfy the relationship $A \geqq B$.

2. The film according to claim 1, wherein said film is coextruded by either slot cast or blown film coextrusion.

3. The film according to claim 1, wherein said third layer comprises a homopolymer or copolymer selected from the group consisting of polyolefin, ionomer and blends thereof.

4. The film according to claim 3, wherein said polyolefin comprises a homopolymer or copolymer selected from the group consisting of polyethylene, polypropylene, polybutylene and blends thereof.

5. The film according to claim 3, wherein said third layer comprises an ionomer or blend thereof.

6. The film according to claim 1, wherein said bond between said second and third layers has an interfacial peel strength of at least 3500 gram-force/inch (1350 newton/meter) as measured in accordance with ASTM F-904 test method when peeled from a second thermoplastic film to which said film has been heat-sealed.

7. The film according to claim 1, wherein said value of B is at least 400 gram-force/inch (154 newton/meter) as measured in accordance with ASTM F-904.

8. The film according to claim 1, wherein said tacky pressure sensitive adhesive comprises a tackifier first component and an elastomer second component of styrene/rubber copolymer.

9. The film according to claim 1, wherein said first layer comprises a polymer having a glass transition temperature of at least 5° C. as measured in accordance with ASTM D-3418 test method.

10. The film according to claim 1, wherein said film further comprises a fourth polymer layer comprising an anhydride-modified polyolefin.

11. The film according to claim 10, wherein said film further comprises a fifth polymer layer comprising a material selected from the group consisting of polyolefin, polyester, polyamide and blends thereof.

12. The film according to claim 1, wherein said film has heat shrinkage value less than about 5% in the machine direction at 90° C. and less than about 5% in the transverse direction at 90° C., as measured in accordance with ASTM D-2732-96 test method.

13. A peelable resealable package comprising a film according to claim 1.

* * * * *

UNITED STATES PATENT AND TRADEMARK OFFICE
CERTIFICATE OF CORRECTION

PATENT NO. : 8,283,011 B2
APPLICATION NO. : 13/021855
DATED : October 9, 2012
INVENTOR(S) : Tara Kay Cruz and Kevin Philip Nelson It is certified that error appears in the above-identified patent and that said Letters Patent is hereby corrected as shown below:

In the Specification:

Column 2, line 28, "50°"" should read -- 5° --.
Column 3, line 6, "diagrammatic a cross-sectional" should read -- diagrammatic cross-sectional --.
Column 3, line 17, "diagrammatic a cross-sectional" should read -- diagrammatic cross-sectional --.
Column 3, line 25, "use" should read -- used --.
Column 4, line 54, "190"C." should read -- 190° C. --.
Column 8, line 23, "comprises" should read -- comprise --.
Column 9, line 17, "at 180°"" should read -- 180° --.
Column 9, line 58, "formed be" should read -- formed by --.
Column 11, line 61, "122" C." should read -- 122° C. --.
Column 12, line 31, "from by" should read -- by --.
Column 12, line 42, "DUPONT • ELVAX®" should read -- DUPONT$^{TM}$ ELVAX® --; "from by" should read -- by --.
Column 13, line 15, "DOW POLYETHYLENE@" should read -- DOW POLYETHYLENE® --.
Column 13, line 22, "TOPAS@" should read -- TOPAS® --.
Column 14, Table 1, "(gram-force/inch" under each column heading for 2nd, 3rd and 4th Peel Strength should read -- (gram-force/inch) --.
Column 15, line 24, "Peal Strength" should read -- Peel Strength --.

Signed and Sealed this
Twenty-fifth Day of June, 2013

Teresa Stanek Rea
*Acting Director of the United States Patent and Trademark Office*